United States Patent [19]

Krause et al.

[11] Patent Number: 4,834,046
[45] Date of Patent: May 30, 1989

[54] CENTRIFUGAL WEIGHT SUPPORT

[75] Inventors: Horst-Herbert Krause, Landwehr; Werner Lemme, Roesrath, both of Fed. Rep. of Germany

[73] Assignee: Kloeckner-Humboldt-Deutz AG, Fed. Rep. of Germany

[21] Appl. No.: 111,441

[22] Filed: Oct. 21, 1987

[30] Foreign Application Priority Data

Oct. 24, 1986 [DE] Fed. Rep. of Germany ....... 3636179

[51] Int. Cl.$^4$ ................. F02M 29/00; F16D 43/06
[52] U.S. Cl. ................. 123/364; 192/105 C; 74/572
[58] Field of Search ............ 123/364, 372, 373; 192/105 C; 74/572, 573, 574

[56] References Cited

U.S. PATENT DOCUMENTS

| 2,003,322 | 6/1935 | Vail | 192/105 C |
| 2,045,557 | 6/1936 | Almen | 192/105 C |
| 2,062,484 | 12/1936 | Timian | 192/105 C |
| 2,164,540 | 7/1939 | Nutt | 192/105 C |
| 2,181,797 | 11/1939 | Bateman | 192/105 C |
| 2,468,685 | 4/1949 | Nutt | 192/105 C |
| 2,513,378 | 7/1950 | Thelander | 192/105 C |
| 3,291,274 | 12/1966 | Wyman | 192/105 C |
| 3,841,111 | 10/1974 | Staudt | 123/364 |
| 4,111,291 | 9/1978 | Horstman | 192/105 C |
| 4,289,101 | 9/1981 | Knorreck | 123/364 |

FOREIGN PATENT DOCUMENTS 601332 5/1948 United Kingdom ........... 192/105 C

*Primary Examiner*—Carl Stuart Miller
*Attorney, Agent, or Firm*—Charles L. Schwab

[57] ABSTRACT

A disc-shaped centrifugal weight support (2) for a centrifugal force governor having recesses (3) for accepting knife-edge supported centrifugal weights (4) maintained in an assembled relationship by abutment means such as a ring (7) to form a single-unit mountable assembly.

10 Claims, 5 Drawing Sheets

U.S. Patent May 30, 1989 Sheet 1 of 5 4,834,046
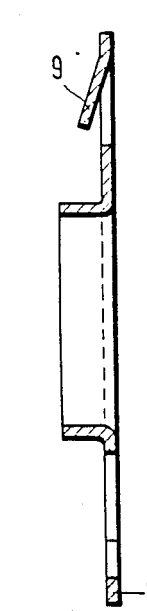
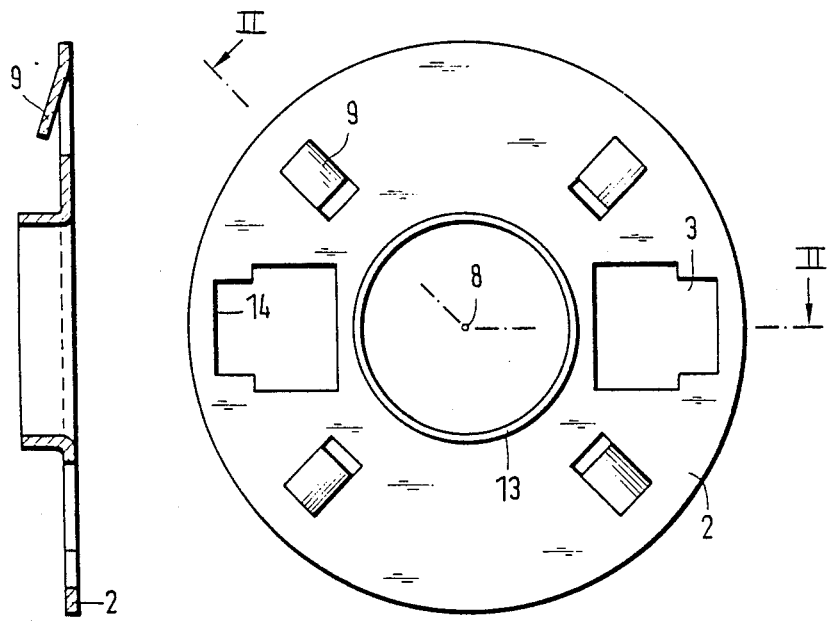
FIG. 2
FIG. 1
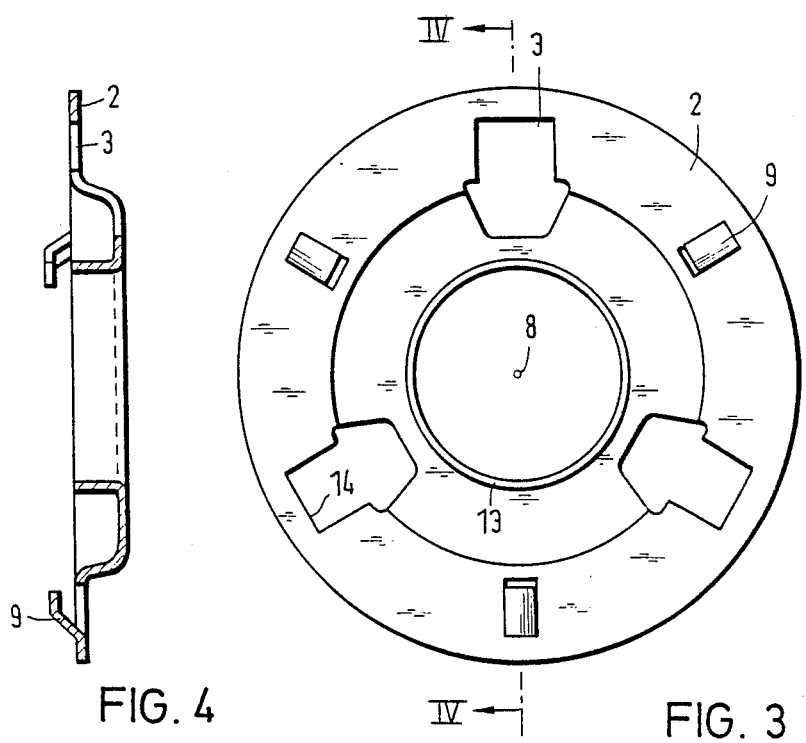
FIG. 4
FIG. 3

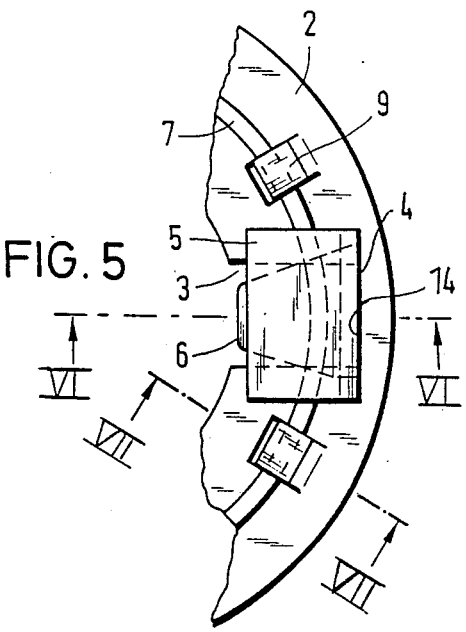
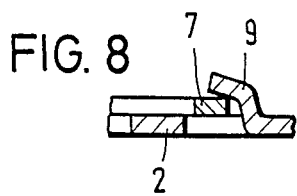
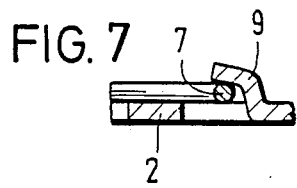
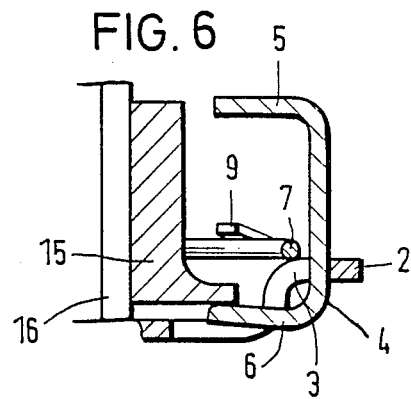

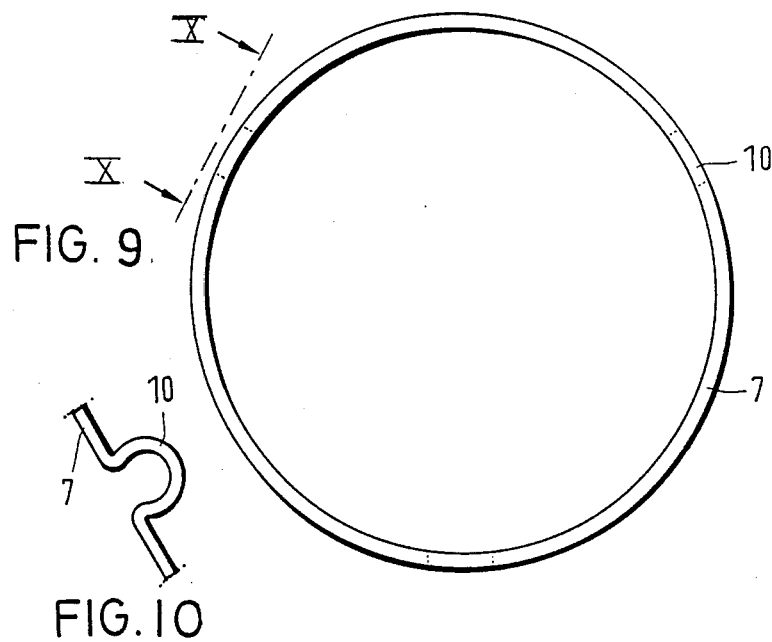
FIG. 9.
FIG. 10
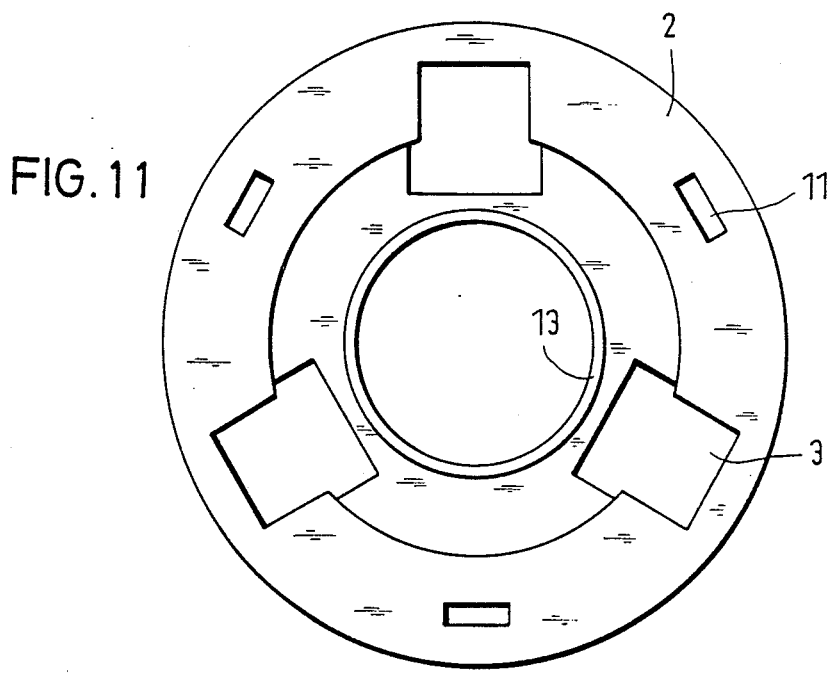
FIG. 11

CENTRIFUGAL WEIGHT SUPPORT

TECHNICAL FIELD

This invention relates to a centrifugal weight support for a centrifugal governor and particularly to means for maintaining the centrifugal weights in assembly with the support.

PRIOR ART STATEMENT

In workshop handbook 2911921 of July 1979 for the model FL 511/W engine manufactured by Kloeckner-Humbolt-Deutz AG, a centrifugal force governor with a disc-shaped centrifugal weight support is represented on page 123 which has three recesses for receiving knife-edge supported, hook-shaped centrifugal weights. The axial position of a governor sleeve is adjusted relative to the centrifugal weight supported by the radial swinging of the centrifugal weights. The centrifugal weight support, the centrifugal weights and the governor sleeve are rotated by the cam shaft of the internal combustion engine. The centrifugal weights are fixed in their radial position on the rotating weight supported by the governor sleeve and by the centrifugal weight support.

A disadvantage in this prior art arrangement lies in the fact that the centrifugal weights must be inserted during assembly in accordance with complicated series of movements and may shift from their correct bearing position when the engine is not running.

OBJECTS AND BRIEF SUMMARY OF THE INVENTION

A main object of this invention is to provide a centrifugal weight support which is easy to assemble with centrifugal weights and is easily installed in a governor. It is a further object of this invention to provide a radial abutment means for keeping the centrifugal weights in assembly with their support and in their proper knife-edge fulcrum position. This object is obtained by the structure defined in claim 1.

In the present invention the centrifugal weights are mounted on the centrifugal weight support in such a manner that they will not be displaced from the recesses in which they are installed. Thus, the centrifugal weights form, together with the centrifugal weight support, a single-unit component or assembly which can be preassembled and need only be inserted as a complete unit during assembly of the centrifugal force governor.

In a preferred embodiment of the invention, an abutment means in the form of an abutment ring is placed in axially overlying relation to the recesses so as to form a radial stop collar for the centrifugal weights. The centrifugal weight support may include circumferentially spaced retainers, at equal radial distances from the center axis of the centrifugal weight support, by which the abutment ring is securely fastened to the centrifugal weight support.

In one embodiment of the invention the abutment ring includes axially extending anchoring catches or loops, which can be inserted into registering pockets or recesses in the centrifugal weight support.

The abutment ring may be inseparably secured to the centrifugal weight support as by, for instance, welding, soldering or gluing.

In another embodiment of the invention the centrifugal weights are held in assembly, after their installation on the centrifugal weight support, by deformed edges of the recesses.

In an additional embodiment deformable molded lugs on opposite sides of the recesses are bent toward one another, after the assembly of the centrifugal weights on the centrifugal weight support, to form a radial stop collar for the centrifugal weights.

Other objects and advantages of the invention will be apparent when the following description is read in conjunction with the accompanying drawings.

THE DRAWINGS

FIG. 1 is a top view of a centrifugal weight support of one embodiment of this invention;

FIG. 2 is a section view taken on the line II—II in FIG. 1;

FIG. 3 is a top view of a centrifugal weight support of a second embodiment of this invention;

FIG. 4 is a section view taken on the line IV—IV in FIG. 3;

FIG. 5 is a top view of a part of a centrifugal weight support with a centrifugal weight held in place by an abutment ring;

FIG. 6 is a section view taken along the line VI—VI in FIG. 5;

FIG. 7 is a section view taken along the line VII—VII in FIG. 5;

FIG. 8 is a section view similar to FIG. 7 but showing an abutment ring of rectangular cross section;

FIG. 9 is a top view of an abutment ring with axially extending anchoring catches;

FIG. 10 is a view taken on the line X—X in FIG. 9;

FIG. 11 is a top view of a centrifugal weight support having recesses in the form of pockets for receiving the catches of the abutment ring shown in FIG. 10;

DETAILED DESCRIPTION OF THE DRAWINGS

Figure 12:
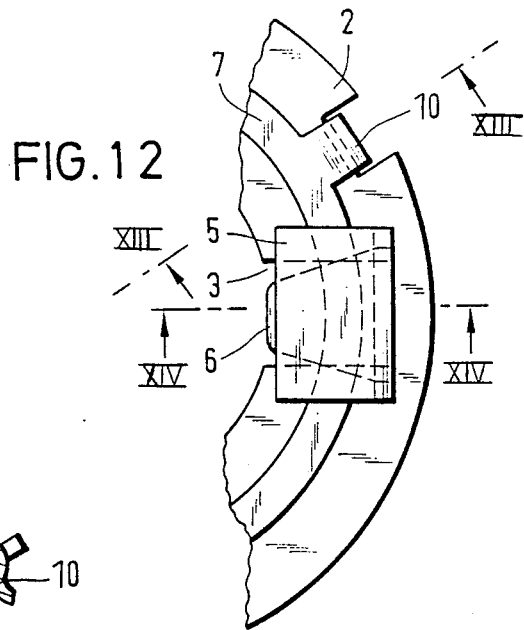
FIG. 12 is a partial top view of a centrifugal weight support having a peripheral recess or pocket for receiving a catch formed on the abutment ring.

FIGS. 1–4 illustrate two embodiments of the invention using a disc-shaped centrifugal weight support 2. In the embodiment of FIGS. 1 and 2, two recesses are provided for knife-edge supported centrifugal weights 4 (see FIG. 5). The recesses 3 in FIG. 1 are diametrically opposite one another relative to the center axis 8 of the centrifugal weight support 2, and at radially opposite sides of an opening 13, which serves to receive a drive shaft 16 (see FIG. 5). The recesses 3 are square-shaped, whereby a straight supporting edge 14 is presented at the radially outward extremity of the recess 3. This supporting edge 14 serves as a support or fulcrum for the knife-edge supported centrifugal weights 4 as illustrated in FIG. 6.

As shown in FIGS. 5–8, the centrifugal weights 4 are radially retained on the centrifugal weight support 2 by means of abutment means which serve to maintain the weight support 2, the centrifugal weights 4 in a single unit assembly. One of these abutment means is a safety abutment ring 7 which extends across the recesses 3 and forms a radial abutment or stop collar for the centrifugal weights 4. In order to be able to secure the abutment ring 7 on the centrifugal weight support 2, punched-out tabs or retainers 9 are provided in circumferentially spaced relation to one another on the centrifugal weight support 2 at the same radial distance from the center axis 8 of the centrifugal weight support 2 as the abutment ring, thus permitting the ring 7 to be securely fastened to the support 2. In the embodiment of FIG. 1 a recess 3 is arranged between two retainers 9, thus providing four retainers. The retainers 9 square-shaped tabs punched out of the centrifugal weight support 2, which project at an acute angle from the centrifugal weight support 2 and thus form mounting supports for receiving the abutment ring 7. The contours of the retainer 9 can, for reasons having to do with fabrication technology, also have a rounded-off shape.

In the FIG. 3 embodiment of the invention, a centrifugal weight support 2 has three recesses 3 for mounting centrifugal weights 4. These three recesses 3 are equally spaced circumferentially in relation to the axis of the centrifugal weight support 2 and are arrow-shaped. Between each of two recesses 3 a retainer 9, similar to the one described in FIG. 1, is provided by punching out a square-shaped tab or piece of the centrifugal weight support 2 so that it projects axially from the centrifugal weight support 2; however, the free end of the tab or retainer 9 extends radially inward toward the direction of the governor sleeve 15 (see FIG. 4). The retainer 9 secures the safety ring 7 in position to form a radial stop collar for the centrifugal weight 4, thus limiting radially inward shifting movement of the weight.

FIG. 5 is a top view of part of a centrifugal weight support 2 of this invention with an assembled safety ring 7 and weight 4. The centrifugal weight 4 includes a balancing arm 5 spaced axially from the centrifugal weight support 2 and an operating or adjustment arm 6 which lies generally parallel to and substantially in the radial plane of the centrifugal weight support 2. The weight 4 includes an axially extending bridge part rigidly interconnecting the arms 5, 6. The bridge part is knife-edge supported on the centrifugal weight support 2 and the weight 4 is held in assembly with the support 2 by the safety abutment ring 7. The safety ring 7 forms a radial stop collar for the centrifugal weight 4. In FIG. 2b a governor sleeve 15 is illustrated which is shiftable axially in the direction of the drive shaft 16 by the centrifugal weights 4. The safety ring 7 can be of rectangular section (FIG. 8) or of circular section (FIG. 7).

In the embodiment of the invention shown in FIGS. 9–11, a different means for retaining the abutment ring is provided. The centrifugal weight support 2 includes recesses in the form of axial openings or pockets 11 at evenly spaced circumferential intervals lying in a circle whose center is on the axis 8 of the centrifugal weight support 2. The safety ring 7 includes retainers in the form of axially extending resilient anchoring catches or loops 10 which project axially from the safety ring 7. The loops 10 register with and are releasably insertable in the pockets 11.

Figure 13:
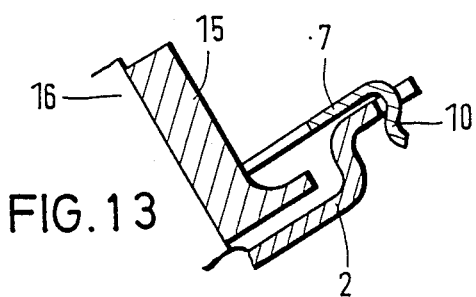
FIG. 13 is a section view taken on the line XIII—XIII in FIG. 12.
Figure 14:
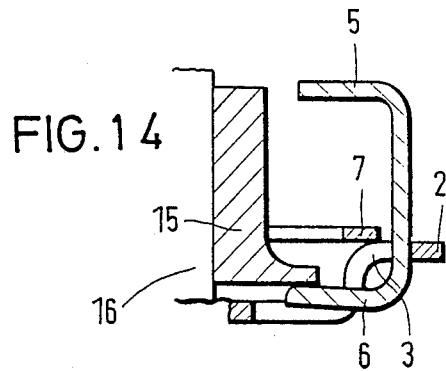
FIG. 14 is a section view taken on the line XIV—XIV in FIG. 12.

In the embodiment of FIGS. 12–14, the abutment ring retainers are anchoring catches 10 which take the form of axially extending resilient fingers on the ring 7 which latchingly engage the edges of circumferentially spaced recesses or pockets on the outer periphery of the centrifugal weight support 2. FIG. 12 is a top view of part of the centrifugal weight support 2 with a safety ring 7 and FIGS. 13 and 14 are sections showing an anchoring catch 10 and a centrifugal weight 4. The drawings illustrate one of the pockets provided on the circumference of the weight support 2 for receiving the catch 10 of the abutment ring 7. The anchoring catches 10 are resiliently flexible and have a curved form. In order to secure the safety ring 7 on the centrifugal weight support 2, a plurality of anchoring catches 10 grip the edges of a plurality of registering pockets. The safety ring 7 may also be integrally secured to the centrifugal weight support as by welding, soldering or gluing. Such a construction would have the advantage of eliminating special recesses or lugs on the centrifugal weight support 2.

Figure 15:
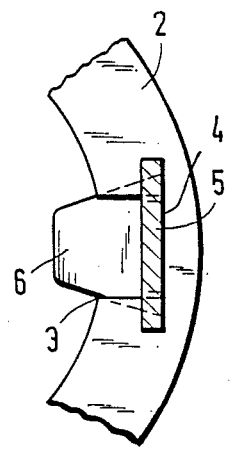
FIGS. 15 and 16 show the sides of a recess before and after they are deformed to retain a centrifugal weight in assembly with the weight support.
Figure 16:
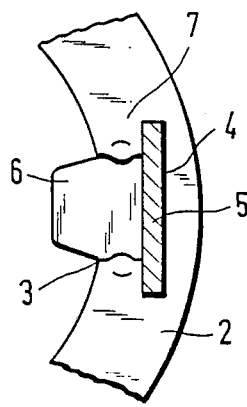

As shown in FIG. 16, radial abutment means 7 can also be provided on the centrifugal weight support 2 by deforming the edges of the recesses 3 after the centrifugal weights 4 are mounted on the centrifugal weight support 2. In FIG. 15 the recess 3 is illustrated before forming the radial abutment means and in FIG. 16 the edges of the recess have been deformed to prevent radial inward dislocation of the weight 4. The deformation of the edges of recess 3 can be accomplished by flattening or peening the edges to round them out toward one another thereby narrowing the recess 3.

Figure 17:
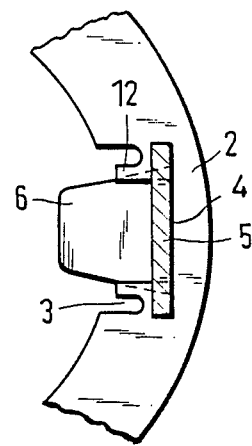
FIG. 17 shows deformable tabs at opposite sides of the recess before being deformed.
Figure 18:
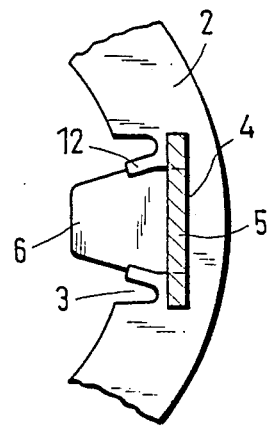
FIG. 18 shows the tabs deformed to radially retain the centrifugal weight.

In FIGS. 17 and 18 an alternative radial abutment means is shown. Here deformable molded lugs 12 are provided at circumferentially opposite sides of the recess 3, which are bent toward one another after mounting the centrifugal weights 4 on the centrifugal weight support 2, thus forming a radial stop collar for the centrifugal weights 4. FIG. 17 shows the molded lugs 12 before being bent to form a radial abutment and FIG. 18 shows the lugs after being bent to narrow the recess 3.

Another alternate radial abutment means can be provided by drilling holes in the centrifugal weight support 2 next to and at opposite circumferential sides of the recesses 3 and then passing a wire or the like through the holes to form a radial stop collar for the centrifugal weights 4. The wire can be a straight resilient piece with curved ends which secure the wire in place upon being inserted into the drilled holes.

The embodiments of the invention in which an exclusive property or privilege is claimed are defined as follows:

1. In a centrifugal force governor for an internal combustion engine, the combination comprising: a disc-shaped centrifugal weight support having a plurality of circumferentially spaced recesses including a radially inward facing edge for receiving knife-edge supported centrifugal weights, a knife-edge supported centrifugal weight in each of said recesses and having a primary balancing arm spaced axially from said centrifugal weight support, a second adjustment arm disposed generally parallel to and near the radial plane of the centrifugal weight support and a bridging portion in radially outward knife-edge engagement with said radially inward facing edge of said recess and radial abutment means on said centrifugal weight support maintaining said centrifugal weights assembled with said centrifugal weight support thereby forming a single-unit mountable assembly, said centrifugal weights being disengaged from said abutment means during operation of said engine.

2. The combination of claim 1 wherein said abutment means comprises an abutment ring extending across said recesses to form a radial stop collar for said centrifugal weights.

3. The combination of claim 2 and further comprising retainers spaced circumferentially from one another equal radial distances from the axis of said centrifugal weight support operative to secure said abutment ring to said centrifugal weight support.

4. The combination of claim 3 wherein said retainers are punched-out tabs on said centrifugal weight support.

5. The combination of claim 3 wherein said centrifugal weight support includes pockets and said retainers are anchoring catches on said abutment ring releasably engaging said pockets.

6. The combination of claim 5 wherein said anchoring catches are resilient loops in said abutment ring.

7. The combination of claim 5 wherein said pockets are in the outer periphery of said centrifugal weight support and said retainers are resilient axially extending fingers on said abutment ring latched, respectively, onto edges of said pockets.

8. The combination of claim 2 wherein said abutment ring is integrally fastened to said centrifugal weight support.

9. The combination of claim 1 wherein said centrifugal weights are retained in assembly with said centrifugal weight support by deformed edges of circumferentially opposite sides of said recesses.

10. The combination of claim 2 wherein deformable molded lugs are provided at circumferentially opposite sides of said recesses and wherein said lugs are bent toward one another after said centrifugal weights are operatively mounted on the centrifugal weight support to thereby form a radial stop collar for said centrifugal weights.

* * * * *

UNITED STATES PATENT AND TRADEMARK OFFICE
CERTIFICATE OF CORRECTION

PATENT NO. : 4,834,046

DATED : May 30, 1989

INVENTOR(S) : Horst-Herbert Krause, Werner Lemme

It is certified that error appears in the above-identified patent and that said Letters Patent is hereby corrected as shown below:

The title page showing the illustrative figure should be deleted to appear as per attached title page.

Signed and Sealed this

Twenty-sixth Day of June, 1990

Attest:

HARRY F. MANBECK, JR.

*Attesting Officer*         *Commissioner of Patents and Trademarks*

United States Patent [19]

Krause et al.

[11] Patent Number: 4,834,046
[45] Date of Patent: May 30, 1989

[54] CENTRIFUGAL WEIGHT SUPPORT

[75] Inventors: Horst-Herbert Krause, Landwehr; Werner Lemme, Roesrath, both of Fed. Rep. of Germany

[73] Assignee: Kloeckner-Humboldt-Deutz AG, Fed. Rep. of Germany

[21] Appl. No.: 111,441

[22] Filed: Oct. 21, 1987

[30] Foreign Application Priority Data

Oct. 24, 1986 [DE] Fed. Rep. of Germany ....... 3636179

[51] Int. Cl.⁴ ...................... F02M 29/00; F16D 43/06
[52] U.S. Cl. ............................... 123/364; 192/105 C; 74/572
[58] Field of Search ................ 123/364, 372, 373; 192/105 C; 74/572, 573, 574

[56] References Cited

U.S. PATENT DOCUMENTS

| 2,003,322 | 6/1935 | Vail | 192/105 C |
| 2,045,557 | 6/1936 | Almen | 192/105 C |
| 2,062,484 | 12/1936 | Timian | 192/105 C |
| 2,164,540 | 7/1939 | Nutt | 192/105 C |
| 2,181,797 | 11/1939 | Bateman | 192/105 C |
| 2,468,685 | 4/1949 | Nutt | 192/105 C |
| 2,513,378 | 7/1950 | Thelander | 192/105 C |
| 3,291,274 | 12/1966 | Wyman | 192/105 C |
| 3,841,111 | 10/1974 | Staudt | 123/364 |
| 4,111,291 | 9/1978 | Horstman | 192/105 C |
| 4,289,101 | 9/1981 | Knorreck | 123/364 |

FOREIGN PATENT DOCUMENTS 601332 5/1948 United Kingdom ............ 192/105 C

Primary Examiner—Carl Stuart Miller
Attorney, Agent, or Firm—Charles L. Schwab

[57] ABSTRACT

A disc-shaped centrifugal weight support (2) for a centrifugal force governor having recesses (3) for accepting knife-edge supported centrifugal weights (4) maintained in an assembled relationship by abutment means such as a ring (7) to form a single-unit mountable assembly.

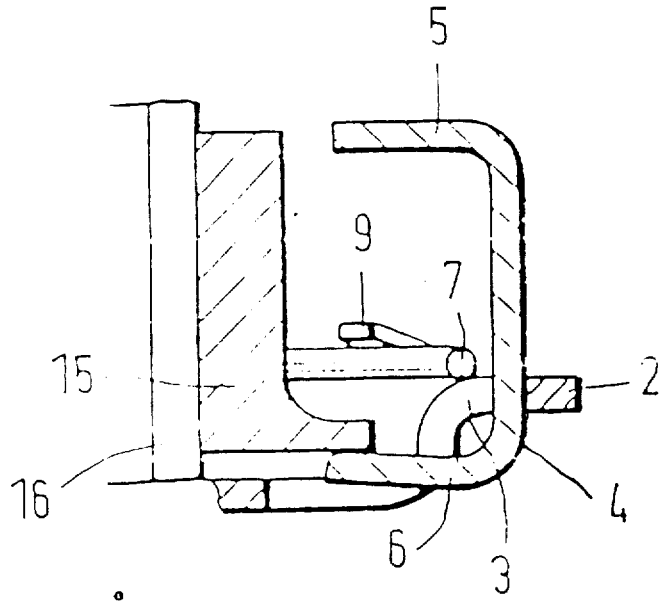

10 Claims, 5 Drawing Sheets